United States Patent
Hebbar (10) Patent No.: US 12,405,881 B2
(45) Date of Patent: Sep. 2, 2025

(54) MACHINE-LEARNING ENABLED INTERFACE FOR SOFTWARE TESTING

(71) Applicant: Truist Bank, Charlotte, NC (US)

(72) Inventor: Nagaraja Hebbar, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 132 days.

(21) Appl. No.: 18/314,946

(22) Filed: May 10, 2023

(65) Prior Publication Data

US 2024/0378134 A1  Nov. 14, 2024

(51) Int. Cl.
*G06F 11/3668* (2025.01)

(52) U.S. Cl.
CPC .................. *G06F 11/3684* (2013.01)

(58) Field of Classification Search
CPC .................. G06F 11/36–3696; G06F 11/3698
See application file for complete search history.

(56) References Cited

U.S. PATENT DOCUMENTS

| | | | | |
|---|---|---|---|---|
| 9,632,906 B2* | 4/2017 | Kraus | ................. | G06F 11/3466 |
| 9,959,200 B2* | 5/2018 | Dolinina | ............. | G06F 11/3684 |
| 10,191,721 B1* | 1/2019 | Kostello | ................. | G06F 40/30 |
| 11,379,350 B2* | 7/2022 | Ranjan Jena | ......... | G06F 40/186 |
| 2013/0137498 A1* | 5/2013 | Willyard | ............. | G06F 11/3688 463/16 |
| 2014/0068410 A1* | 3/2014 | Dolinina | ............. | G06F 11/3684 715/234 |
| 2015/0212920 A1* | 7/2015 | Kraus | ................. | G06F 11/3006 717/127 |
| 2019/0034172 A1* | 1/2019 | Kostello | ................... | G06F 8/20 |
| 2022/0058114 A1* | 2/2022 | Ranjan Jena | .......... | G06N 20/00 |
| 2024/0345940 A1* | 10/2024 | Prakash | .............. | G06F 11/3608 |

* cited by examiner

*Primary Examiner* — Todd Aguilera
(74) *Attorney, Agent, or Firm* — Kilpatrick Townsend & Stockton LLP; Michael A. Springs, Esq.

(57) ABSTRACT

A computing environment can implement software testing based on attributes derived from natural language inputs. For example, a system can receive a natural language input describing a software test. The system can apply a trained machine-learning model to the natural language input to determine attributes of the software test. The system can select a predefined script template based on the attributes. The system can then populate variable parameters of the predefined script template using the attributes in the entry to create a runtime test script. The runtime test script can be configured to implement the software test, as customized based on the attributes. The system can provide the runtime test script to a running service. The running service can execute the software test consistent with the variable parameters.

20 Claims, 4 Drawing Sheets

MACHINE-LEARNING ENABLED INTERFACE FOR SOFTWARE TESTING

TECHNICAL FIELD

The present disclosure relates generally to software testing and, more particularly (although not necessarily exclusively), to producing a machine-learning enabled interface for software testing.

BACKGROUND

Software testing can be a process of evaluating and verifying that a software product or application performs as intended. Each software product can undergo frequent software testing due to, for example, updates to the product. A software test can be customized and executed in accordance with attributes that can be defined when the software test is created.

SUMMARY

A software test can be produced based on attributes derived from natural language input. For example, a method described herein can include receiving, by one or more processors, the natural language input describing the software test. The method can also include applying, by the one or more processors, a trained machine-learning model to the natural language input to determine attributes of the software test. The method can further include selecting, by the one or more processors, a predefined script template based on the attributes. The predefined script template can be selected from a group of predefined script templates. The method can also include populating, by the one or more processors, variable parameters of the predefined script template using the attributes to create a runtime test script. The runtime test script can implement the software test as customized based on the attributes. Additionally, the method can include providing by the one or more processors, the runtime test script to a running service. The running service can interpret the runtime test script and thereby execute the software test consistent with the variable parameters.

In another example, a software test computing system described herein can include one or more processors and one or more memories. The one or more memories can include instructions executable by the one or more processors to perform operations. The operations can include receiving the natural language input describing the software test. The operations can also include applying a trained machine-learning model to the natural language input to determine attributes of the software test. The operations can further include selecting a predefined script template based on the attributes. The predefined script template can be selected from a group of predefined script templates. The operations can also include populating variable parameters of the predefined script template using the attributes to create a runtime test script. The runtime test script can implement the software test as customized based on the attributes. Additionally, the operations can include providing the runtime test script to a running service. The running service can interpret the runtime test script and thereby execute the software test consistent with the variable parameters.

In another example, a non-transitory computer-readable medium described herein can include instructions that are executable by one or more processing devices for causing the one or more processing devices to perform operations. The operations can include receiving the natural language input describing the software test. The operations can also include applying a trained machine-learning model to the natural language input to determine attributes of the software test. The operations can further include selecting a predefined script template based on the attributes. The predefined script template can be selected from a group of predefined script templates. The operations can also include populating variable parameters of the predefined script template using the attributes to create a runtime test script. The runtime test script can implement the software test as customized based on the attributes. Additionally, the operations can include providing the runtime test script to a running service. The running service can interpret the runtime test script and thereby execute the software test consistent with the variable parameters.

DETAILED DESCRIPTION

Certain aspects and examples of the present disclosure relate to providing a user interface through which users can input, in natural language text, the desired attributes for a software test. The system can then execute a natural-language processing (NLP) model on the user input to derive the desired attributes from the input. Based on the desired attributes, the system can automatically select a script from among a group of predefined script templates and populate the selected script template. In particular, variable parameters of the predefined script template can be populated using the attributes to create a runtime test script. The system can then provide the runtime test script to a running service configured to interpret the runtime test script and execute the software test consistent with the configured parameters. In this way, the system can provide a way for anyone, not just skilled software developers, to customize and run a software test that has certain desired attributes without having to perform any software coding.

The NLP model can be trained with a training dataset that includes natural language data. The natural language data may include any suitable textual content, such as content from blog posts, books, academic papers, social media, websites, and the like. The NLP model can use the natural language data during a training process to learn how to interpret the natural language inputs and, in some cases, provide natural language responses to engage in a conversation with the user to understand the testing attributes sought by the user. The NLP model may be any suitable type of NLP model. For example, the NLP model may be a neural network, such as a generative pre-trained transformer (GPT) model.

In some examples, the system can generate an entry in a file based on the attributes derived by the NLP model. For example, the system can generate a line entry (e.g., a new row) specifying the attributes in a spreadsheet file. The system can then select a script template, from among the group of predefined script templates, by opening the file and extracting the attributes from the entry. The entry in the file can be added to and stored in a record of the attributes used in software tests. Maintaining the record of the attributes used in software tests can assist in an assessment of performance of the NLP model. The entry can be included in a report of results of the software test shared with a software developer.

In a conventional scenario, when a software product is to be tested, software developers can create a script defining the software test and execute the software test. But manually developing the script can be a slow process that can be error prone. Creating such scripts can also require specialized expertise and programming experience, and tie up resources, since it can require a trained software developer to take time to complete the development of the script. Additionally, if testing circumstances change or a modification to the software test is desired for another reason, the software developer must manually re-code a portion of the script. These and other factors can make it difficult for less-technical individuals to participate in the testing process. Some examples can overcome these problems by providing a system through which user with less technical skill can quickly and easily run custom software tests, without having to perform any software coding themselves.

As an illustrative example, natural language inputs can be received describing a software test. The natural language inputs can take on a form such as a following phrase spoken into a microphone by a user: "execute a software test to determine how the system would handle a transfer of an amount of value between three accounts. All of the amount of value will be removed from account A and received by account B and account C. An amount received by account B will equal the amount received by account C". The user in this case is not a software developer and does not understand any computer languages.

The trained machine-learning model can be applied to the natural language inputs to determine attributes of the software test. In this example, the attributes can include a type of request (e.g., "a transfer") and a number of accounts involved in the request (e.g., "between three accounts"). In some examples, the trained machine-learning model can automatically identify superfluous words in the natural language inputs and ignore the superfluous words in determining the attributes. Examples of superfluous words can include "a", "the," "of," "and," or "by." By having the trained machine-learning model ignore superfluous words, processing speed may be enhanced.

The software test computing system can automatically generate a line item in an Excel spreadsheet file that incorporates the attributes determined by the trained machine-learning model. One column of the line entry can include a recommended predefined script template, which in this example can be a predefined script template associated with transfers between accounts. The predefined script template can be selected based on the line entry. In this case, the recommended predefined script template in the Excel spreadsheet is chosen as the predefined script template.

Variable parameters of the predefined script template can be populated using the attributes in the line entry of the Excel spreadsheet. For example, the predefined script template can include three tokens, each of the three tokens can represent one of the accounts mentioned in the natural language inputs. Each of the tokens can be a randomized value that represents a valid account for the software test.

Populating the variable parameters of the predefined script template can create the runtime test script. In some examples, the tokens can be included in a properties file and the properties file can be incorporated into the runtime test script. The software test computing system can provide the runtime test script to a running Java service. The running Java service can interpret the runtime test script and execute the software test consistent with the variable parameters.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
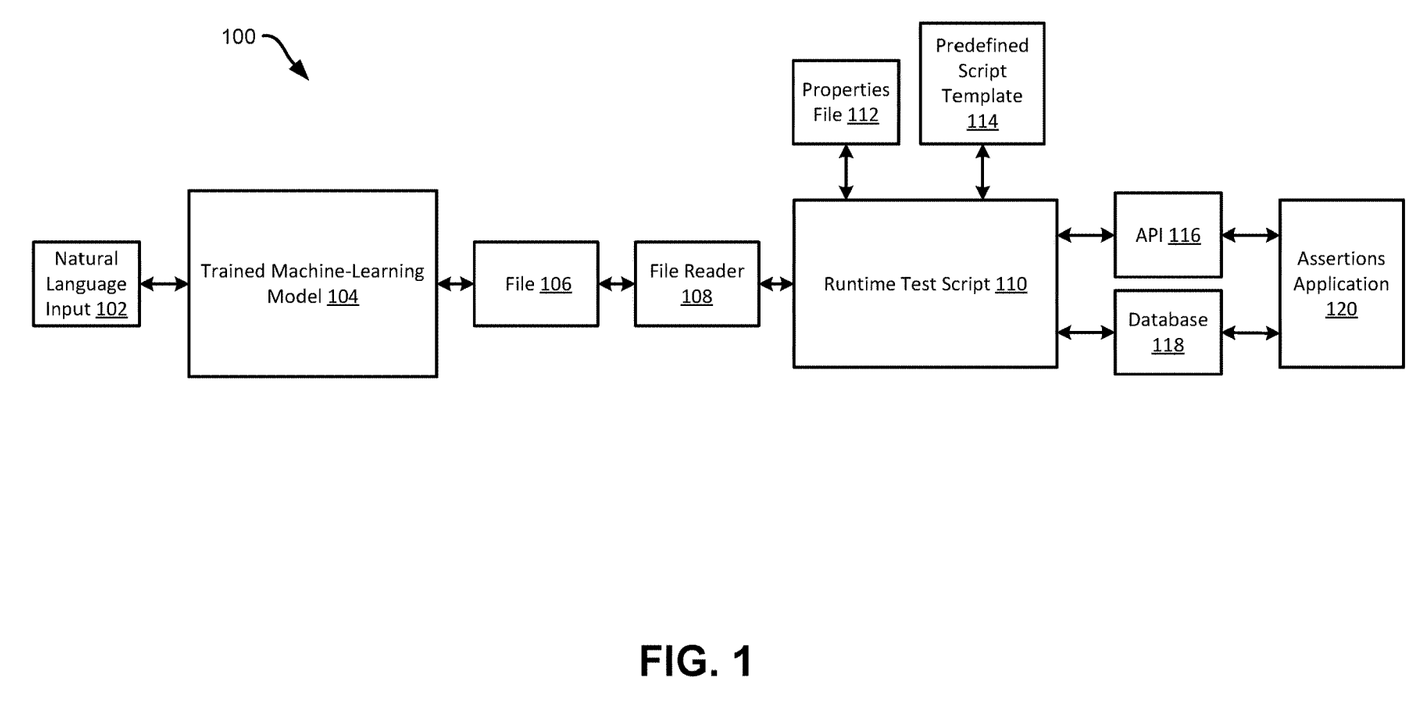
FIG. 1 is a block diagram of an example of a software test environment for producing a software test based on attributes derived from natural language input according to some aspects of the present disclosure.

FIG. 1 is a block diagram of an example of a software test computing system 100 for producing a software test based on attributes derived from natural language input 102 according to some aspects of the present disclosure. The software test computing system 100 can include the natural language input 102, a trained machine-learning model 104, a file 106, a file reader 108, a properties file 112, a predefined script template 114, a runtime test script 101, an application programming interface (API) 116, a database 118, and an assertions application 120.

The trained machine-learning model 104 can be applied to the natural language input 102 to derive attributes. NLP can be a subfield of machine-learning and computer science that involves an interaction between computers and humans using human languages. An objective of NLP can be to extract meaning and understanding from content of human communication in text and speech. NLP can be used to automate a process based on what a person says.

NLP can enable computers to understand natural language as humans do. NLP can use artificial intelligence to take natural language input, process the natural language input, and make sense of the natural language input in a way a computer can understand. At some point in the processing, the natural language input can be converted to code that a computer can understand. In some examples, NLP can be used to automatically derive attributes of a software test and execute the software test based on the derived attributes.

In some examples, a processor of the software test computing system 100 can create the file 106 and automatically generate an entry in the file 106. The entry can include the attributes derived by the trained machine-learning model 104. The file reader 108 can extract the entry from the file 106, determine the attributes in the entry, and based on attributes in the entry, automatically select the predefined script template 114 and can create the properties file 112. The properties file 112 can include tokens. For example, an attribute in the entry can specify that a randomized invalid account should be incorporated in the software test. The randomized invalid account can take a form of a token included in the properties file 112. The predefined script template 114 can include variable parameters. The tokens generated in the properties file 112 can be used to populate some of the variable parameters of the predefined script template 114. The variable parameters of the predefined script template 114 can be configured based on the attributes of the entry, to thereby generate a runtime test script 110.

The runtime test script 110 can be configured to execute a software test on a target software program. The runtime test script 110 may be configured to perform a variety of operations to test the target software program. One example of such an operation may include automatically generating random numbers for use in another part of the software test. The runtime test script 110 can be used as a body for a call to the API 116. The API 116 can call up a running service such as a running Java service and pass along information including the attributes in the runtime test script 110 to the running service. The running service can interpret the runtime test script 110 and execute the software test consistent with the variable parameters of the predefined script template 114 and other parameters of the runtime test script 110. Once the software test is executed, a test response can be produced.

During the execution of the software test, a call to the database 118 may be initiated. The database 118 can produce a database response based on the parameters of the runtime test script 110. The database may respond to the call by providing data, which can be used by the software test.

The software test can generate a test result that can be received by the assertions application 120. The assertions application 120 can compare the test result to an expected test result. If actual test result matches the expected test result, then the software test can be considered a 'Pass'. If actual test result does not match the expected test result, then the result of the software test can be considered a 'Fail'.

The assertions application 120 can automatically generate a report that can include the "Pass/Fail" results. For example, the report can be a HTML file. The assertions application 120 can automatically send the report to developers. In some examples, the report is sent to the developers via email. The report can be sent immediately after results of the software test are complete or the assertions application 120 can delay sending the report. For example, if the software test is completed over a weekend, the assertions application can wait until Monday morning to send the report.

Figure 2:
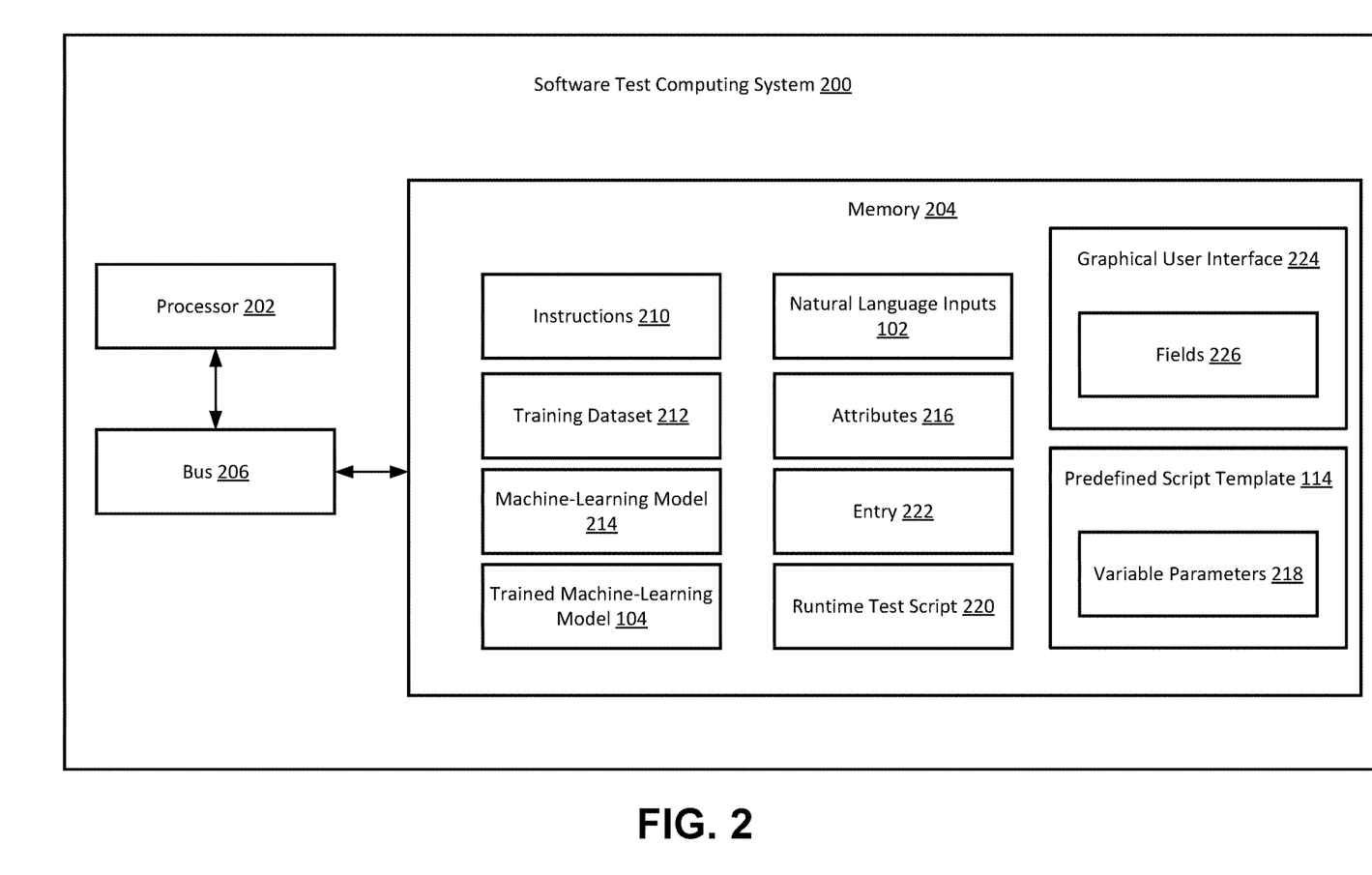
FIG. 2 is a block diagram of an example of a computing system for producing a software test populated with attributes derived from natural language input according to some aspects of the present disclosure.

FIG. 2 is a block diagram of an example of a software test computing system 200 for producing a software test populated with attributes derived from natural language input according to some aspects of the present disclosure. As shown, the software test computing system 200 includes the processor 202 communicatively coupled to the memory 204 by a bus 206. The processor 202 can include one processing device or multiple processing devices. Non-limiting examples of the processor 202 include a Field-Programmable Gate Array (FPGA), an application specific integrated circuit (ASIC), a microprocessor, or any combination of these. The processor 202 can execute instructions 210 stored in the memory 204 to perform operations. In some examples, the instructions 210 can include processor-specific instructions generated by a compiler or an interpreter from code written in any suitable computer-programming language, such as C, C++, C#, Python, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 210. The non-transitory computer-readable medium can include electronic, optical, magnetic, or other storage devices capable of providing the processor 202 with the instructions 210 or other program code. Non-limiting examples of the non-transitory computer-readable medium include magnetic disk(s), memory chip(s), RAM, an ASIC, or any other non-transitory medium from which a computer processor can read instructions 210.

The memory 204 can further include a machine-learning model 214, a trained machine-learning model 104, a training dataset 212, natural language inputs 102, attributes 216, an entry 222, a runtime test script 220, a predefined script template 114, and a graphical user interface (GUI) 224. The predefined script template 114 can include variable parameters 218. The GUI 224 can include fields 226.

The software test computing system 200 can generate the trained machine-learning model 104 by training the machine-learning model 214 with the training dataset 212 to learn how to interpret the natural language inputs 102. The training dataset 212 can include natural language data.

The software test computing system 200 can receive the natural language inputs 102 and apply the trained machine-learning model 104 to the natural language inputs 102 to determine the attributes 216 of the software test. The attributes 216 can be changeable properties or characteristics of the software test that can be set to different values. The attributes 216 of the software test can be used to produce the entry 222 in a file 106.

A file reader 108 can interpret the entry 222 in the file 106 and, based on attributes in the entry 222, automatically select the predefined script template 114. The predefined script template 114 can be selected from among several predefined script templates stored in a database. The predefined script template 114 can be in any suitable format, such as a JSON, XML, HTML, or file exchange script.

The variable parameters 218 of the predefined script template 114 can be configured (e.g., populated) based on the attributes in the entry 222 to create the runtime test script 220. Once configured, the variable parameters 218 can include generated tokens that represent information, such as types of user accounts. For example, a software test can check to see how a system handles a request to transfer an amount of value from a first account to a second account. The first account can be a verified valid account and the second account can be invalid and unverified. The variable parameters can include a first token that generates a random first number to define the first valid account. The variable parameters can also include a second token that generates a second random number to represent the invalid and unverified second account number.

In some examples, the GUI 224 can be used in place of the file 106. The attributes 216 determined by the trained machine-learning model 104 can be used to populate the fields 226 of the GUI 224. After the system 200 populates the fields 226, a prompt can be presented to a user via the GUI 224. The prompt can ask the user to confirm that the content in the fields 226 are correct. The user can then make any necessary adjustments to the content in the fields 226, for example to correct any errors made by the machine-learning model 214 when interpreting the natural language inputs 102. After making any necessary adjustments and/or confirming that the fields 226 have the correct information, the user can select a button to continue with the process. In response to detecting the user selection of the button, the system 200 can interpret the fields 226 of the GUI 224 and, based on attributes in the fields 226, automatically select the predefined script template 114. The variable parameters 218 of the predefined script template 114 can be populated using the attributes in the fields 226 to create the runtime test script 220.

Once the runtime test script 220 is created, the software test computing system 200 can provide the runtime test script 220 to a running service. For example, the running service can be a running Java service. The running service can interpret the runtime test script 220 and execute the software test consistent with the variable parameters 218 of the predefined script template 114.

Figure 3:
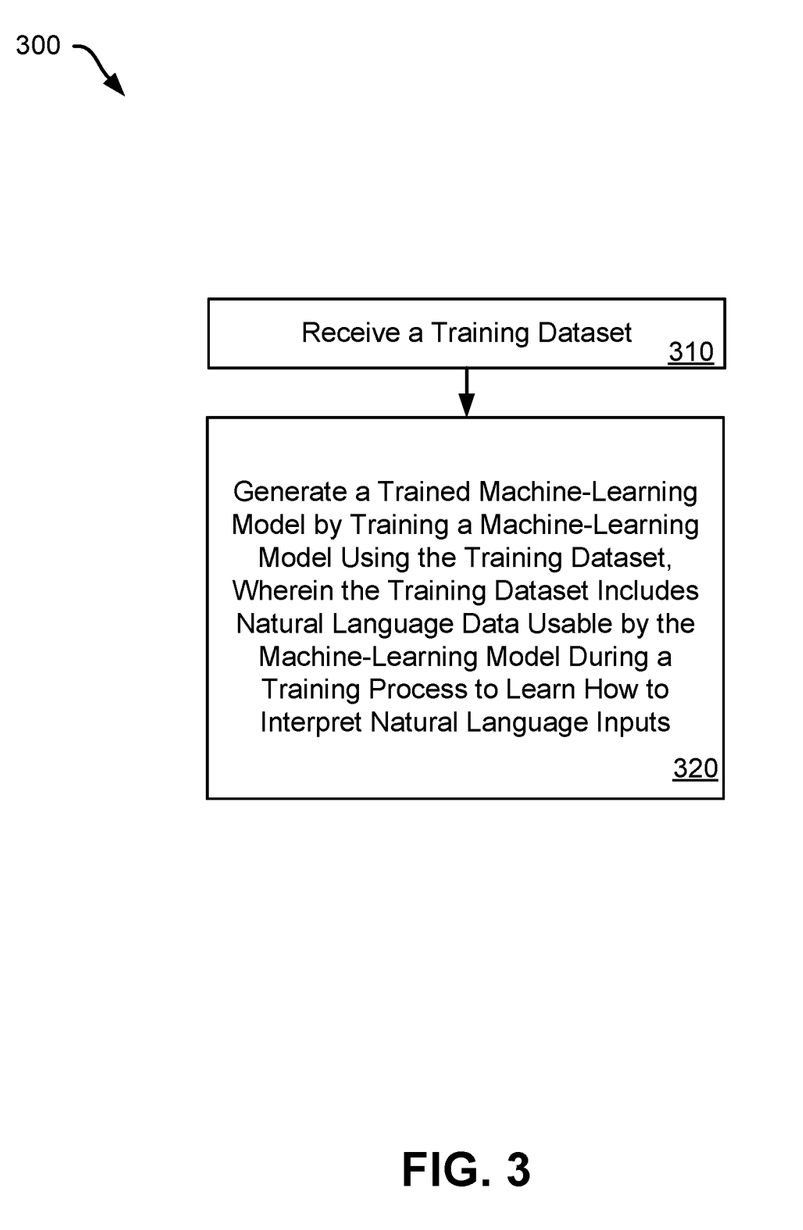
FIG. 3 is a flow chart of an example of a process for training a machine-learning model to learn how to interpret natural language inputs according to some aspects of the present disclosure.
Figure 4:
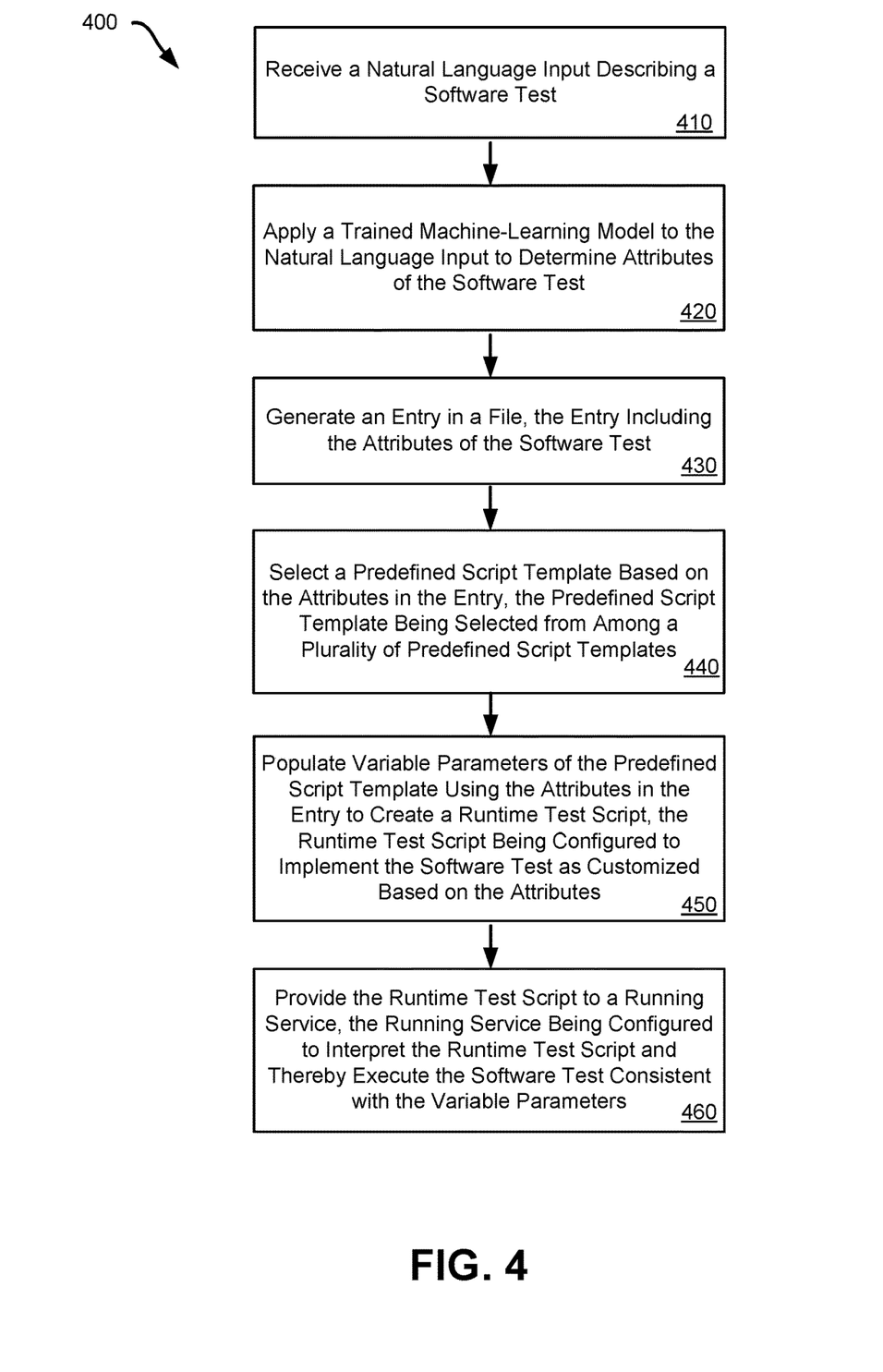
FIG. 4 is a flow chart of an example of a process for producing a software test populated with attributes derived from natural language input by a trained machine-learning model according to some aspects of the present disclosure.

In some examples, the software test computing system 200 can implement the process 300 shown in FIG. 3, or the process 400 shown in FIG. 4. Other examples can involve more operations, fewer operations, different operations, or a different order of the operations shown in those figures. The operations of FIG. 3 will now be described below with reference to the components described above. Some or all of the steps of the process 300 or the process 400 can be performed by the processor 202.

Referring now to FIG. 3, at block 310, the process 300 involves receiving a training dataset 212. The training dataset 212 can include natural language text. The training dataset 212 can include correlations between natural language textual descriptions of software tests and the corresponding desired testing attributes. The training dataset 212 can be created from a series of interviews with persons of various amounts of experience in software development, including no experience at all. A person can be shown results of historical software tests and asked to explain words or phrases that could be used to set up the historical software tests.

After receiving the training dataset 212, the training dataset 212 can be used to train a machine-learning model 214 to interpret natural language input from a user, where the natural language input is associated with initiating a software test with certain attributes. The user can be unskilled in software development, for example if the user has no formal training in software development. The input can be typed input, for instance using a computer keyboard, or spoken input.

At block 320, the process 300 involves generating a trained machine-learning model 104 using the training dataset 212. The natural language content included in the training dataset 212 can be used during a training process by the machine-learning model 214 to learn how to interpret natural language inputs 102. For example, the machine-learning model 214 can learn to interpret natural language inputs 102 by identifying keywords or key phrases in the training dataset 212. The keywords or key phrases can be linked to specific attributes of software tests. Some examples of the keywords or key phrases include "manual testing", "automated testing', "regression testing", "quality assurance", "cases", and "functions".

Over time, the training dataset 212 can be updated with natural language input used in recent software-test requests. The machine-learning model 214 can then be re-trained based on the updated training dataset, so as to further (e.g., continually) refine the machine-learning model 214 over time.

FIG. 4 is a flow chart of an example of a process for producing a software test populated with attributes 216 derived from natural language input 102 by a trained machine-learning model 104 according to some aspects of the present disclosure. Other examples may include more operations, fewer operations, different operations, or a different sequence of operations than are shown in FIG. 4. The operations of the process 400 can start at block 410.

At block 410, the process 400 involves receiving the natural language input 102 describing a software test. The natural language input 102 can be typed into a user interface or the natural language input 102 can be spoken to a microphone associated with a software test computing system 200. In some examples, an authentication step can occur to verify that a user that provided the natural language input has authorization to initiate the software test. For example, after receiving the natural language input 102, the software test computing system 200 can provide a prompt asking the user to provide a username and password. In some examples, the authentication step can involve a two-step authentication process. Such as, sending a randomized passcode via text to the user after verifying the username and the password and providing a prompt to allow the user to submit the randomized passcode.

At block 420, the process 400 involves applying a trained machine-learning model 104 to the natural language input 102 to determine attributes 216 of the software test. The attributes 216 can be changeable properties or characteristics of the software test that can be set to different values. The values of the changeable properties or characteristics can be alphanumeric in nature.

In some cases, the trained machine-learning model 104 can provide natural language responses to engage in a conversation with the user to understand the testing attributes sought by the user. For instance, if the attributes 216 determined by the trained machine-learning model 104 are not specific enough to allow a software test computing system to select a single predefined script template, the trained machine-learning model can ask the user questions until the answers provided by the user provide enough information to eliminate all options for a predefined script template 114 except for one option.

At block 430, the process 400 involves generating an entry 222 in a file 106. The entry 222 can include the attributes 216 of the software test. In some examples, a GUI 224 can be used in place of the file 106, in the sense that fields 226 of the GUI 224 can be populated with the attributes 216. Once populated, the fields 226 can include the attributes 216 of the software test derived by the trained machine-learning model 104.

At block 440, the process 400 involves selecting a predefined script template 114 based on the attributes 216 (e.g., in the entry 222). The predefined script template 114 can be selected from among a group of predefined script templates. In some examples, selecting the predefined script template 114 can be based on the attributes 216 in the fields 226 of the GUI 224. The predefined script template 114 can be in the form of a JSON, XML, HTML, or file exchange script.

At block 450, the process 400 involves populating variable parameters 218 of the predefined script template 114 using the attributes 216 in the entry 222. In some examples, the predefined script template 114 can include variable parameters that have been previously designated as crucial variable parameters. If the attributes 216 provide insufficient information to populate the crucial variable parameters, the trained machine-learning model can continue to engage in a conversation with the user until enough information is determined to populate the crucial variable parameters. In some cases, if the attributes 216 provide insufficient information to populate a variable parameter, and the variable parameter is not designated as a crucial variable parameter, a predefined default value can be used to populate the variable parameter.

When the GUI 224 is used in place of the file 106, the variable parameters 218 of the predefined script template 114 can be populated using the attributes 216 in the fields 226. By populating the variable parameters 218, a runtime test script 220 can be created. The runtime test script 220 can implement the software test as customized based on the attributes 216. In some examples, a properties file 112 can be incorporated into the runtime test script 220.

At block 460, the process 400 involves providing the runtime test script 220 to a running service. An example of the running service is a Java running service. The running service can interpret the runtime test script 220 and execute the software test consistent with the variable parameters 218.

Results of the software test can be received by an assertions application 120. The assertions application 120 can compare the results of the software test to expected output data or an expected result. If the results of the software test match the expected output data, then a result of the software test can be considered a 'Pass'. If the results of the software test do not match the expected output data, then the result of the software test can be considered a 'Fail'.

The assertions application 120 can automatically generate a report that can include the "Pass/Fail" results. For example, the report can be a HTML file. The assertions application 120 can automatically send the report to developers. In some examples, the report is sent to the developers via email. The report can be sent immediately after results of the software test are complete or the assertions application 120 can delay sending the report. For example, if the software test is completed over a weekend, the assertions application can wait until Monday morning to send the report.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
executing, by one or more processors, a trained machine-learning model to engage in a natural language conversation with a user about a software test, wherein the natural language conversation involves the user describing attributes of the software test in a natural language format in response to one or more prompts from the trained machine-learning model, wherein the trained machine-learning model is configured to continue the natural language conversation at least until information usable to populate a crucial variable in a script template is received from the user, the crucial variable being a variable predesignated as crucial;
determining, by the one or more processors, the attributes of the software test based on the natural language conversation;
selecting, by the one or more processors, a predefined script template based on the attributes, the predefined script template being selected from among a plurality of predefined script templates, wherein the predefined script template includes the crucial variable;
populating, by the one or more processors, variable parameters of the predefined script template to create a runtime test script, wherein populating the variable parameters involves populating a parameter of the crucial variable based on the information and populating at least one other variable parameter based on the attributes, the runtime test script being configured to implement the software test as customized based on the attributes and the information; and
providing, by the one or more processors, the runtime test script to a running service, the running service being configured to interpret the runtime test script and thereby execute the software test consistent with the variable parameters.

2. The method of claim 1, further comprising:
receiving, by the one or more processors, a training dataset; and
generating, by the one or more processors, the trained machine-learning model by training a machine-learning model using the training dataset, wherein the training dataset includes natural language data usable by the machine-learning model during a training process to learn how to interpret natural language inputs.

3. The method of claim 1, further comprising populating fields in a graphical user interface (GUI) with the attributes of the software test, and wherein populating the variable parameters comprises populating the variable parameters of the predefined script template using content of the fields in the GUI to create the runtime test script.

4. The method of claim 1, wherein the variable parameters comprise at least one generated token that represents a type of user account.

5. The method of claim 1, further comprising generating an entry in a file, the entry comprising the attributes of the software test.

6. The method of claim 1, further comprising comparing, by the one or more processors, a result of the software test with an expected result to determine if the software test passed or failed.

7. The method of claim 1, further comprising automatically sending, by the one or more processors, a report of the software test to a developer.

8. A software test computing system comprising:
one or more processors; and
one or more memories that include instructions executable by the one or more processors to perform operations comprising:
executing a trained machine-learning model to engage in a natural language conversation with a user about a software test, wherein the natural language conversation involves the user describing attributes of the software test in a natural language format in response to one or more prompts from the trained machine-learning model, wherein the trained machine-learning model is configured to continue the natural language conversation at least until information usable to populate a crucial variable in a script template is received from the user, the crucial variable being a variable predesignated as crucial;
determining the attributes of the software test based on the natural language conversation;
selecting a predefined script template based on the attributes, the predefined script template being selected from among a plurality of predefined script templates, wherein the predefined script template includes the crucial variable;
populating variable parameters of the predefined script template to create a runtime test script, wherein populating the variable parameters involves populating a parameter of the crucial variable based on the information and populating at least one other variable parameter based on the attributes, the runtime test script being configured to implement the software test as customized based on the attributes and the information; and providing the runtime test script to a running service, the running service being configured to interpret the runtime test script and thereby execute the software test consistent with the variable parameters.

9. The software test computing system of claim 8, wherein the operations further comprise:

receiving a training dataset; and generating the trained machine-learning model by training a machine-learning model using the training dataset, wherein the training dataset includes natural language data usable by the machine-learning model during a training process to learn how to interpret natural language inputs.

10. The software test computing system of claim 8, wherein the operations further comprise populating fields in a graphical user interface (GUI) with the attributes of the software test, and wherein populating the variable parameters comprises populating the variable parameters of the predefined script template using content of the fields in the GUI to create the runtime test script.

11. The software test computing system of claim 8, wherein the variable parameters comprise at least one generated token that represents a type of user account.

12. The software test computing system of claim 8, wherein the operations further comprise generating an entry in a file, the entry comprising the attributes of the software test.

13. The software test computing system of claim 8, wherein the operations further comprise comparing a result of the software test with an expected result to determine if the software test passed or failed.

14. The software test computing system of claim 8, wherein the operations further comprise automatically sending a report of the software test to a developer.

15. A non-transitory computer-readable medium comprising instructions that are executable by one or more processing devices for causing the one or more processing devices to perform operations comprising:

executing a trained machine-learning model to engage in a natural language conversation with a user about a software test, wherein the natural language conversation involves the user describing attributes of the software test in a natural language format in response to one or more prompts from the trained machine-learning model, wherein the trained machine-learning model is configured to continue the natural language conversation at least until information usable to populate a crucial variable in a script template is received from the user, the crucial variable being a variable predesignated as crucial;

determining the attributes of the software test based on the natural language conversation;

selecting a predefined script template based on the attributes, the predefined script template being selected from among a plurality of predefined script templates, wherein the predefined script template includes the crucial variable;

populating variable parameters of the predefined script template to create a runtime test script, wherein populating the variable parameters involves populating a parameter of the crucial variable based on the information and populating at least one other variable parameter based on the attributes, the runtime test script being configured to implement the software test as customized based on the attributes and the information; and providing the runtime test script to a running service, the running service being configured to interpret the runtime test script and thereby execute the software test consistent with the variable parameters.

16. The non-transitory computer-readable medium of claim 15, the operations further comprising:

receiving a training dataset; and generating the trained machine-learning model by training a machine-learning model using the training dataset, wherein the training dataset includes natural language data usable by the machine-learning model during a training process to learn how to interpret natural language inputs.

17. The non-transitory computer-readable medium of claim 15, the operations further comprising populating fields in a graphical user interface (GUI) with the attributes of the software test, and wherein populating the variable parameters comprises populating the variable parameters of the predefined script template using content of the fields in the GUI to create the runtime test script.

18. The non-transitory computer-readable medium of claim 15, wherein the variable parameters comprise at least one generated token that represents a type of user account.

19. The non-transitory computer-readable medium of claim 15, wherein the operations further comprise generating an entry in a file, the entry comprising the attributes of the software test.

20. The non-transitory computer-readable medium of claim 15, the operations further comprising comparing a result of the software test with an expected result to determine if the software test passed or failed.

* * * * *